(12) United States Patent
Becker et al.

(10) Patent No.: US 10,838,934 B2
(45) Date of Patent: Nov. 17, 2020

(54) MODIFYING ARCHIVE DATA WITHOUT TABLE CHANGES

(71) Applicant: INTERNATIONAL BUSINESS MACHINES CORPORATION, Armonk, NY (US)

(72) Inventors: Patric Becker, Haltern am See (DE); Thomas Immel, Boeblingen (DE); Daniel Martin, Stuttgart (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 15/690,644

(22) Filed: Aug. 30, 2017

(65) Prior Publication Data

US 2019/0065536 A1    Feb. 28, 2019

(51) Int. Cl.
*G06F 16/21* (2019.01)
*G06F 16/25* (2019.01)
*G06F 16/22* (2019.01)
*G06F 16/2455* (2019.01)

(52) U.S. Cl.
CPC ............ *G06F 16/219* (2019.01); *G06F 16/21* (2019.01); *G06F 16/2282* (2019.01); *G06F 16/2455* (2019.01); *G06F 16/2456* (2019.01); *G06F 16/254* (2019.01)

(58) Field of Classification Search
CPC .... G06F 16/219; G06F 16/21; G06F 16/2455; G06F 16/2456; G06F 16/2282; G06F 16/254
See application file for complete search history.

(56) References Cited

U.S. PATENT DOCUMENTS

| 7,725,439 | B2 | 5/2010 | Doney |
| 8,583,613 | B2 * | 11/2013 | Liu ...................... G06F 16/258 707/695 |
| 8,825,604 | B2 | 9/2014 | Draese et al. |
| 9,286,300 | B2 | 3/2016 | Draese et al. |
| 9,507,810 | B2 | 11/2016 | Baeuerle et al. |

(Continued)

OTHER PUBLICATIONS

Aulbach et al. 'Extensibility and Data Sharing in evolving multi-tenant databases'. Apr. 2011. 2011 IEEE 27th International Conference on Data Engineering. p. 99-110. (Year: 2011).*

(Continued)

*Primary Examiner* — James E Richardson
(74) *Attorney, Agent, or Firm* — L. Jeffrey Kelly

(57) ABSTRACT

A method, computer system, and computer program product for accessing archived data in a data processing system. The data processing system includes a transactional engine maintaining a first data table and an analytical engine. The method includes first archiving at the analytical engine the first data table, resulting in a first archived data table. Changes applicable to the first archived data table may be archived, wherein the second archiving includes: in case the changes induce a change in the structure of the first archived data table or modify the values of the first data table a second archived data table is created. In case the changes include data having a structure different from the structure of the first archived data table part of the changes that is storable according to the structure of the first archived data table may be inserted in the first archived data table.

24 Claims, 7 Drawing Sheets

(56) References Cited

U.S. PATENT DOCUMENTS

| | | | | |
|---|---|---|---|---|
| 9,898,488 | B2* | 2/2018 | Schrum | G06F 16/2365 |
| 2009/0037455 | A1* | 2/2009 | Doney | G06F 16/213 |
| 2009/0187612 | A1* | 7/2009 | Kaijima | G06F 16/25 |
| 2009/0307277 | A1* | 12/2009 | Grubov | G06F 11/1451 |
| 2011/0191299 | A1* | 8/2011 | Huynh Huu | G06F 16/00 |
| | | | | 707/646 |
| 2011/0252002 | A1* | 10/2011 | Ben-Dyke | G06F 16/213 |
| | | | | 707/661 |
| 2012/0179728 | A1* | 7/2012 | Harris | G06F 16/213 |
| | | | | 707/803 |
| 2013/0218843 | A1 | 8/2013 | Agrawal et al. | |
| 2014/0040199 | A1* | 2/2014 | Golab | G06F 16/219 |
| | | | | 707/634 |
| 2014/0095441 | A1* | 4/2014 | Draese | G06F 16/113 |
| | | | | 707/661 |
| 2014/0095443 | A1* | 4/2014 | Draese | G06F 16/27 |
| | | | | 707/661 |
| 2014/0372374 | A1* | 12/2014 | Bourbonnais | G06F 16/273 |
| | | | | 707/613 |
| 2016/0179850 | A1* | 6/2016 | Martin | G06F 16/214 |
| | | | | 707/634 |
| 2017/0139909 | A1* | 5/2017 | Karri | G06F 16/164 |
| 2018/0096000 | A1* | 4/2018 | Harrison | G06F 16/24578 |
| 2018/0096001 | A1* | 4/2018 | Soza | G06F 16/254 |

OTHER PUBLICATIONS

Herrmann et al. 'Living in Parallel Realities: Co-Existing Schema Versions with a Bidirectional Database Evolution Language'. May 2017. SIGMOD '17 Proceedings of the 2017 ACM International Conference on Management of Data pp. 1101-1116 (Year: 2017).*

Roddick. 'A survey of schema versioning issues for database systems'. In Information and Software Technology 37(7):383-393 • Jan. 2000 (Year: 2000).*

Mell et al., "The NIST Definition of Cloud Computing," U.S. Department of Commerce, National Institute of Standards and Technology, Sep. 2011, p. 1-7, Special Publication 800-145.

Curino et al., "Graceful Database Schema Evolution: the PRISM Workbench", VLDB '08, Aug. 24-30, 2008, Auckland, New Zealand, pp. 1-12.

Ra et al., "A Transparent Object-Oriented Schema Change Approach Using View Evolution", Proceedings of the Eleventh International Conference on Data Engineering, Mar. 6-10, 1995, Taipei, Taiwan, IEEE, pp. 165-172.

Bastin et al., "Digitisation of documents and legal archiving", Doloitte, https://www2.deloitte.com/lu/en/pages/technology/articles/digitisation-documents-and-legal-archiving.html#, Feb. 10, 2014, pp. 1-6.

* cited by examiner

MODIFYING ARCHIVE DATA WITHOUT TABLE CHANGES

BACKGROUND

The present invention relates to the field of digital computer systems, and more specifically, to a method for accessing archived data in a data processing system.

Archiving data in database systems is a common solution to improve performance and responsiveness of the database system. Data no longer needed for daily operational business may be moved to an archive database system. The data volume may thus be reduced in the database system, resulting in reduced storage usage and faster query response times. However, archive database systems are independent of the database system and require the use of a dedicated application program interface (hereinafter "API") to access the archived data, and the access is not integrated with the database system from which the archive data originates. This causes technical constraints, in particular when propagating changes to archived data from the database system to the archive systems.

SUMMARY

According to an embodiment, a method, a computer system, and a computer program product for accessing archived data in a data processing system is provided. The present invention may include the data processing system including a transactional engine maintaining a first data table and an analytical engine, first archiving at the analytical engine the first data table, resulting in a created first archived data table having the structure of the first data table, second archiving at the analytical engine changes applicable to the first archived data table, the second archiving including in case the changes induce a change in the structure of the first archived data table or modify the values of the first archived data table creating a second archived data table, in case the changes include data having a structure different from the structure of the first archived data table inserting in the first archived data table part of the changes that is storable according to the structure of the first archived data table, and storing the remaining part of changes in the second archived data table, in case the changes include data having a same structure as the structure of the first archived data table storing the changes in the second archived data table if the changes involve an update of an existing record of the first archived data table, or storing the changes in the first archived data table if the changes involve a new record, receiving at the analytical engine a query for accessing archived data, and in case the query involves data other than data in the first archived data table, modifying the received query for running the query on a joint of the first and second archived data tables, otherwise running the received query on the first archived data table.

In another embodiment, the invention relates to a computer program product comprising a computer-readable storage medium having computer-readable program code embodied therewith, the computer-readable program code configured to implement all of steps of the method according to preceding embodiments.

In another aspect, the invention relates to an analytical engine for providing access to archived data. The analytical engine is configured for first archiving at the analytical engine the first data table, resulting in a first archived data table, second archiving at the analytical engine changes applicable to the first archived data table, the second archiving including in case the changes induce a change in the structure of the first archived data table or modify the values of the first archived data table creating a second archived data table, in case the changes include data having a structure different from the structure of the first archived data table inserting in the first archived data table part of the changes that is storable according to the structure of the first archived data table, and storing the remaining part of changes in the second archived data table, in case the changes include data having a same structure as the structure of the first archived data table storing the changes in the second archived data table if the changes involve an update of an existing record of the first archived data table, or storing the changes in the first archived data table if the changes involve a new record, receiving at the analytical engine a query for accessing archived data, in case the query involves data other than data in the first archived data table, modifying the received query for running the query on a joint of the first and second archived data tables, otherwise running the received query on the first archived data table.

In an embodiment, the invention may include a data processing system including the analytical engine of the previous embodiment and a transactional engine comprising the first data table, wherein the transactional engine is configured for sending data to be archived to the analytical engine.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
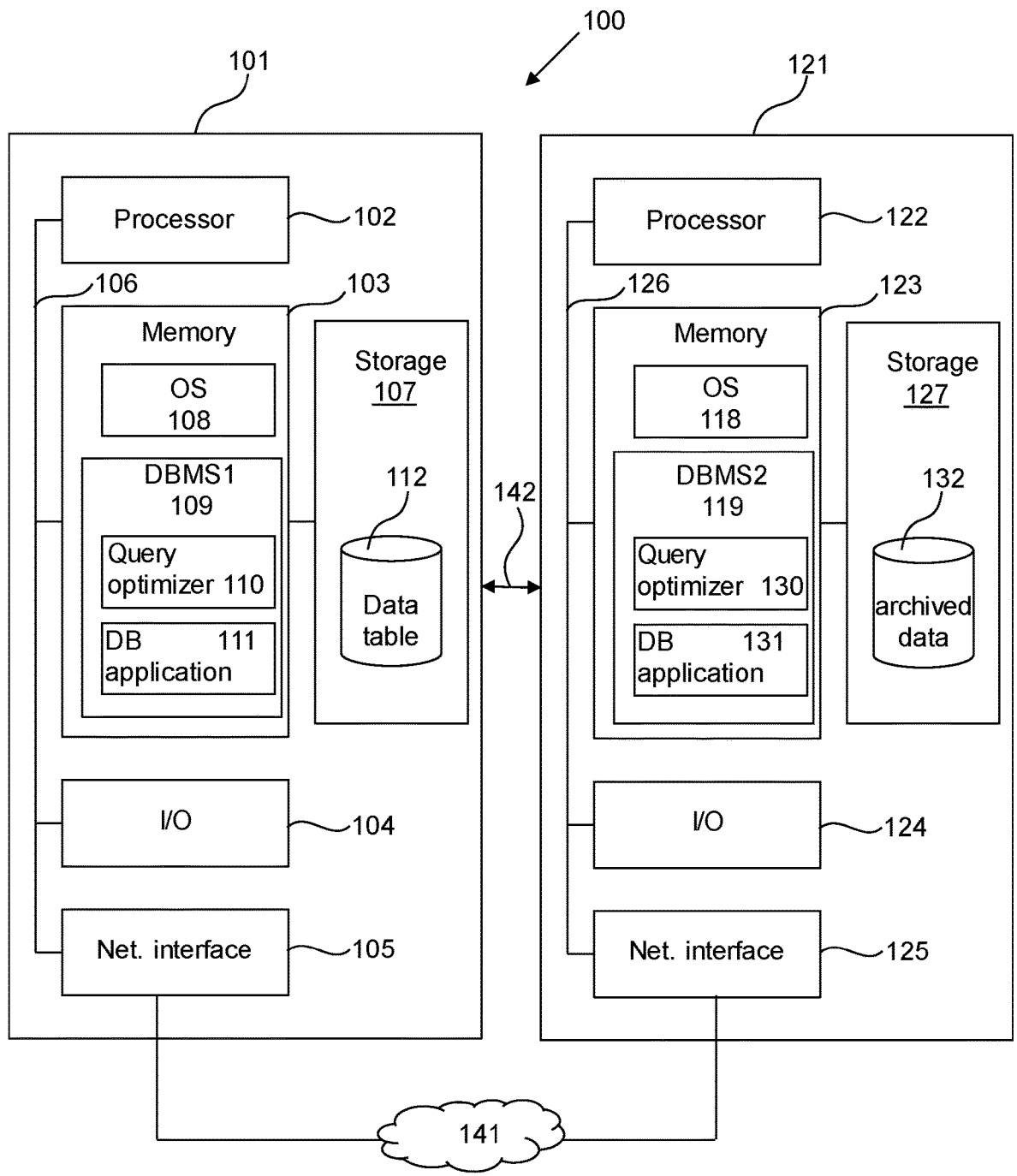
FIG. 1 depicts a data processing system according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

A data processing system may be a hybrid database management system (hereinafter "DBMS") or may implement a hybrid DBMS such as IBM® DB2® Analytics Accelerator (IDAA)® (IBM and DB2 are registered trademarks of International Business Machines Corporation) products that serve a number of different operating system platforms. DB2® is a relational database management system (hereinafter "RDBMS"). In order to address a multitude of workload types with different requirements and goals, the data processing system is composed from more than one execution engine (the transactional and analytical engines) such that each of the execution or database engine may have a respective set of resources adapted to run on the datasets available at execution engine. For example, the transactional engine may require less resources compared to the analytical engine as the first dataset may be smaller than the second dataset.

A "transaction" or "database transaction" is a logical unit of database operations which are executed as a whole to process user requests. A transaction is a larger unit that includes and frames one or more statements. A transaction ensures that the action of the framed statements is atomic. For example, if a transaction fails, the transaction may be undone. A transaction may be atomic with respect to different database operations such as recovery operations. An atomic transaction is a series of irreducible database operations, such that all occur or none occur. A recovery operation refers to restoring of committed actions e.g. in case of a system failure.

The term "data table" or data set as used herein refers to a collection of data that may be presented in tabular form. Each column in the data table may represent a particular variable or attribute. Each row in the data table may represent a given member, record or entry of the data table.

Database systems are tailored towards storing structured data, i.e. the data resides in tables, which have a specific schema—sets of columns with data types and constraints. Examples for data types are INTEGER, or VARCHAR. Constraints can be conditions like NOT NULL or user-specific constraints such as year_of_birth>=1900. Frequently, users need mandate schema changes. Examples are adding new columns to a table or extending the length of an existing VARCHAR column. However, changing the schema in the source may make it much more difficult or even impossible to restore archive data. For example, if a new column is added to the table in a relational database, backups (image copies) of the table taken some time ago when the column did not exist may not be restorable to this table any longer. A database structure may include a database table, which includes rows and columns.

Another situation may be that archived data may have to be changed, e.g. to correct invalid information. For example, if an insurance claim was rejected and needs to be reopened after a few years, the data for the claim may already have been archived. Oftentimes, the claim data shall not be restored into the operative system just for a minor change, especially if the restore operation may be expensive. Instead, a direct modification of the archived data is desirable. Modifying the schema of archived data or modifying the archive data itself may have imposed technical limitations (e.g. from separate archive systems), and there may also be legal limitations. For example, some purposes of (legal) archives require that "It is not possible to modify documents" as key features for the system. There may also be business reasons preventing any kind of changes to archive data.

The present method provides a way to logical allow schema modifications and/or data changes on archive data while not physically changing the schema or modifying the data of the previously created archived data. The present method uses a separate data structure next to the archived data, which tracks the various changes. In IDAA, for example, the use of an additional table to manage data/schema changes applicable to the archive data and combining this additional table at run-time with the actual archive table is desired. Thus, access to the original, unchanged archived data is still possible, while schema changes/data corrections can be applied and can allow the continued and integrated use of the archive data, e.g. an application with additional columns. IDAA is a hardware application for DB2.

The changes that require the creation of the second archived data table do not include the addition of records that preserve the structure of the first archived data table and that do not affect the values already stored of the first archived data table e.g. adding only a record having values of the attributes of the first archived data table may not require the creation of the second archived data table as that record may be appended to already archived data in the first archived data table.

According to an embodiment, the method further includes third archiving at the analytical engine changes to the previously created archived data tables, the third archiving including in case the changes induce a change in the structure of at least one table of the previously created archived data tables or the changes modify the values of the previously created archived data tables creating a further archived data table, in case the changes include data having a structure different from the structures of the at least one table inserting in the previously created archived data tables part of the changes that is storable according to the structures of the previously created archived data tables, and storing the remaining part of changes in the further archived data table, in case the changes include data having a same structure as the structure of the previously created archived data tables storing the changes in the further archived data table if the changes involve an update of an existing record of the previously created archived data tables, or storing the changes in the previously created archived data tables if the changes involve a new record, receiving at the analytical engine another query for accessing archived data in case the other query involves data other than data in the previously created archived data table, modifying the received other query for running the other query on a joint of the previously created archived data tables and the further archived data table, otherwise running the received query on the previously created archived data tables. The previously created archived data tables to be joined with the further data table are the archived data tables created before the third archiving.

For example, the second archived data table becomes part of the archive data. The method applicable to the first archived data table is applicable to the second archived data table as well. For example, the access to the archived data may be performed as follows. Assuming for example that the archived data includes the first archived data table resulting from the first archiving, the second archived data table resulting from the second archiving involving changes of the structure of the first archived data table, and a third archived data table resulting from a third archiving with changes involving schema or structure changes of the first and/or second archived data tables. In an example, a single database view that combines the first, second and third database views may be created. The database view enables to query the archived data in a transparent manner by for example redirecting queries against the archived data for running against the database view. In another example, two database views may be created resulting in a cascade of views. A first database of view of the two data base views combines the first and second database views resulting in a first combination. A second database view of the two database views combines the first combination with the third database view. The cascade of views may have the advantage to enable querying the archive data in a transparent manner i.e. the archived data may be accessed as it was in the past with the schema or structure that was in use.

According to an embodiment, the method further includes defining a database view over a combination of the first and second archived data tables, wherein the modifying of the received query includes redirecting the received query for running against the database view.

The database view may be realized as a view in a relational database using SQL as access method. The database view combines an unchanged archive table (i.e. the first archived data table) with the additional table being the second archived data table.

According to an embodiment, the joint of the first and second archived data tables being obtained by joining the first archived data table with records of the second archived data table having entities of the first archived data table.

To that end, the following embodiments describe how each scenario of data modification or schema modification may efficiently be handled.

According to an embodiment, the changes include an additional attribute of the first data table.

According to an embodiment, the changes involve a change of the type of an attribute of the first data table.

According to an embodiment, in case the changes include data having a same structure as the structure adding an attribute to the third archived data table indicating the type of the update. The update may for example include a deletion or replacement of an existing record.

According to an embodiment, the data processing system is a hybrid on-line analytical processing (hereinafter "OLTP") and on-line analytical processing (hereinafter "OLAP") database system, wherein the transactional engine is configured for performing OLTP processes, wherein the analytical engine is configured for performing OLAP processes. This embodiment may seamlessly be integrated in existing data warehouse systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider;

Broad network access: capabilities are available over a network and accessed through standard mechanisms that promote use by heterogeneous thin or thick client platforms (e.g., mobile phones, laptops, and PDAs);

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter);

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time; and Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings;

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations; and Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises;

Community cloud: the cloud infrastructure is shared by several organizations and supports a specific community that has shared concerns (e.g., mission, security requirements, policy, and compliance considerations). It may be managed by the organizations or a third party and may exist on-premises or off-premises;

Public cloud: the cloud infrastructure is made available to the general public or a large industry group and is owned by an organization selling cloud services; and Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Referring to FIG. 1, a block diagram for a data processing system 100 is depicted, according to an embodiment. The data processing system 100 is for a hybrid DBMS suited for implementing method steps as involved in the disclosure. The data processing system 100 includes a first computer system 101 (also referred to as transactional engine) connected to a second computer system 121 (also referred to as analytical engine or accelerator engine). The first computer system 101 may for example include an IBM® zSystem. The second computer system 121 may for example include an IBM® Netezza system. IBM is a registered trademark of International Business Machines Corporation.

The first computer system 101 includes processor 102, memory 103, I/O circuitry 104 and network interface 105 coupled together by bus 106.

The processor 102 may represent one or more processors (e.g. microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

The memory 103 in combination with storage device 107 may be used for local data and instruction storage. The storage device 107 may include one or more persistent storage devices and media controlled by I/O circuitry 104. The storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The memory 103 may include one or more separate programs e.g. database management system DBMS1 109, each of which includes an ordered listing of executable instructions for implementing logical functions, notably functions involved in embodiments of this invention. The software in memory 103 shall also typically include an operating system (hereinafter "OS") 108. The OS 108 controls the execution of other computer programs for implementing at least part of methods as described herein. The DBMS1 109 includes a DB application 111 and a query optimizer 110. The DB application 111 may be configured for processing data stored in the storage device 107. The query optimizer 110 may be configured for generating or defining query plans for executing queries e.g. on the first dataset 112. The first dataset 112 may for example include transaction data that provides real time or near real time transaction data for OLTP analysis such as postings from a manufacturing control system.

The second computer system 121 includes processor 122, memory 123, I/O circuitry 124 and network interface 125 coupled together by bus 126.

The processor 122 may represent one or more processors (e.g. microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

The memory 123 in combination with storage device 127 may be used for local data and instruction storage. The storage device 127 includes one or more persistent storage devices and media controlled by the I/O circuitry 104. The storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The memory 123 may include one or more separate programs e.g. database management system DBMS2 119, each of which includes an ordered listing of executable instructions for implementing logical functions, notably functions involved in embodiments of this invention. The software in the memory 123 shall also typically include a suitable OS 118. The OS 118 essentially controls the execution of other computer programs for implementing at least part of methods as described herein. The DBMS2 119 may include a DB application 131 and a query optimizer 130. The DB application 131 may be configured for processing data stored in storage device 127. The query optimizer 130 may be configured for generating or defining query plans for executing queries on data stored on the second computer system 121.

In another example, the second computer system 121 may be configured to include archived data 132. The archived data 132 may be obtained by replicating or copying the data from the first computer system 101 to the second computer system 121.

The first computer system 101 and the second computer system 121 may be independent computer hardware platforms communicating through a high-speed connection 142 or a network 141 via network interfaces 105, 125. The network 141 may for example includes a local area network (LAN), a general wide area network (WAN), a cloud network, and/or a public network (e.g., the Internet). Each one of the computer systems 101, 121 is responsible for managing its own copies of the data.

Although shown in FIG. 1 as separate systems, the first and second computer systems 101, 121, may belong to a single system e.g. sharing a same memory and processor hardware, while each of the first and second computer systems 101, 121, is associated with a respective DBMS and datasets e.g. the two DBMSs, i.e. DBMS1 109 and DBMS2 119, may be stored in the shared memory. In another example, the two database management systems DBMS1 109 and DBMS2 119 may form part of a single DBMS that enables communications and method performed by DBMS1 109 and DBMS2 119 as described herein. The first dataset 112 and a second dataset, for example the archived data 132, may be stored on a same storage or on separate storages.

The data processing system 100 may for example categorize every incoming query and execute it on the engine that meets the query characteristics best. The first computer system 101 may for example be responsible for efficient lookup in transactional workloads in OLTP and may be optimized for accessing limited amounts of data e.g. of the first dataset 112. The second computer system 121 may be responsible for data scans in the scope of analytical applications in OLAP, which require to read large amounts of data in a single query.

The first computer system 101 may for example be configured to: archive at least a portion of data from the first computer system 101 onto the second computer system 121. The first computer system 101 may for example be further configured to determine whether data satisfying a received query includes the archived data or non-archived data, and in response to the determined data being the archived data, transfer the received query from the first computer system to the second computer system to retrieve archived data satisfying the received query. The received query may for example be transferred as part of a database transaction.

The first data table 112 may have a predefined structure indicating the way the data is organized. For example, the structure of the first data table 112 may indicate attributes or columns of the first data table 112.

The first computer system 101 may be configured to replicate data to the second computer system 121. The replication may for example include moving data from the first computer system 101 to the second computer system 121 and deleting data which is moved from the first computer system 101. In another example, the replication of data may include copying the data to the second computer system 121 while maintaining the replicated data in the first computer system 101. At least a portion of the replicated data at the second computer system 121 may be archived at the second computer system 121. The portion of the replicated data may be present only in the archived data table. For example, assuming that the first computer system 101 includes the first data table 112 as part of a larger table T. For example, T may have 12 records and the first data table 112 may have 3 records. The replication may result in the data table T with 12 records being copied or moved into the second computer system 121. The second computer system 121 includes the table T. Archiving, for example, at the second computer system 121 the first data table 112 having the three records of T into an archived data table T_ARCH, would result in deleting the three records from T in both the second computer system 121 and from the first computer systems 101 if the first computer system 101 maintains T. The second computer system 121 would thus include the table T having only 9 records and T_ARCH having the three records, while the first computer system 101 includes T without the three records. The archived three records (i.e. the first data table) exist only in T_ARCH.

The archived data only exists in T_ARCH. The non-archived data exists in the data table T in the first computer system 101 and as a copy in the second computer system 121. The advantage of having both T and T_ARCH at the second computer system 121 may be a query requiring access to non-archived data and archived data together can completely be executed in the second computer system 121. The execution of the query at the second computer system 121 may be performed by joining the data in T and T_ARCH before querying the joined data.

Figure 2:
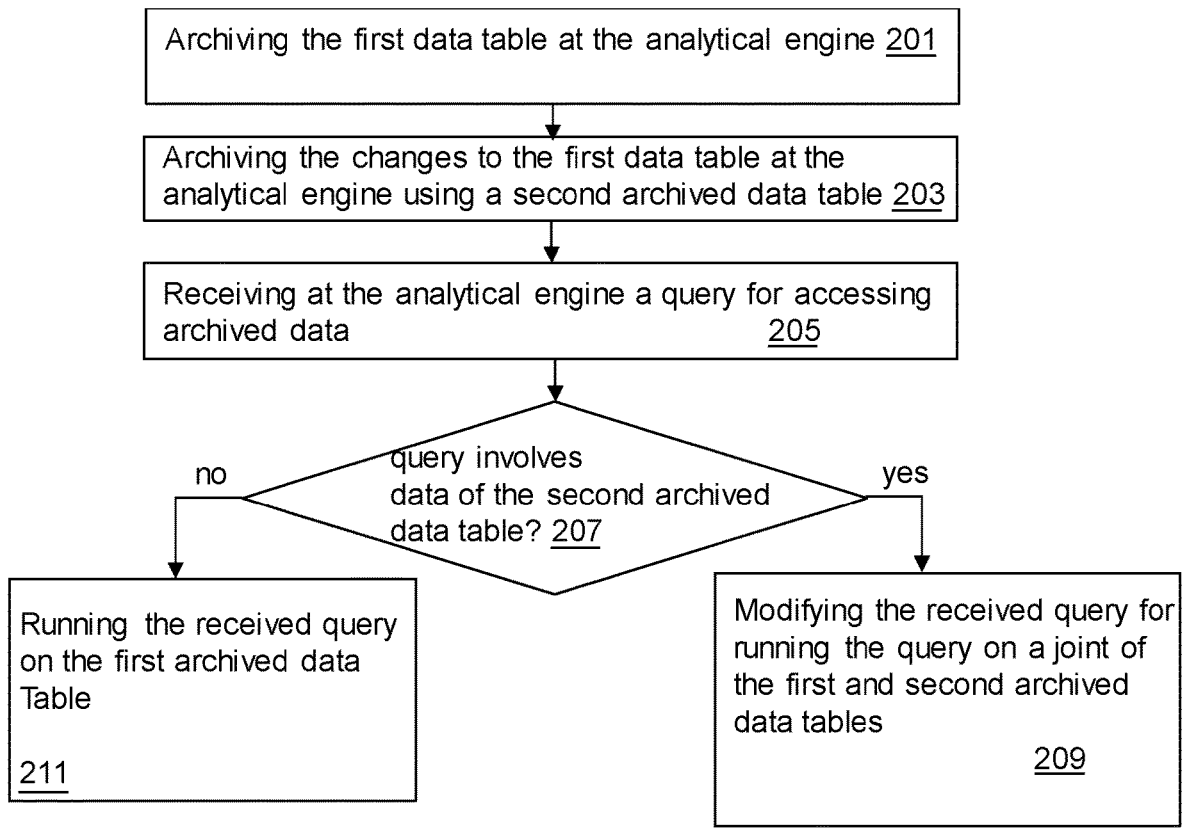
FIG. 2 is a flowchart of a method for accessing archived data in the data processing system according to at least one embodiment.

Referring to FIG. 2, a flowchart of a method for accessing archived data in a data processing system e.g. 100 is depicted, according to an embodiment.

In step 201, the first data table 112 is archived at the analytical engine 121, resulting in a first archived data table at the analytical engine. The first archived data table has the same structure as the first data table 112, e.g. having the same attributes and data stored in respective columns as in the first data set 112. The first data set 112 may also be referred to as the first data table 112.

For example, the first data table 112 may be part of a larger data table T e.g. having N records. The larger data table T has the same structure as the first data table 112. Before the archiving of the first data table, the larger data table T may be replicated to the analytical engine. The replication may be performed as explained above. The first data table 112 may for example include the first half N/2 of records of the larger data table T. These first N/2 records may for example be archived because they reached a given age etc. The archiving of the first data table 112 results in deleting the first data table content from the larger data table T at the analytical engine 121 and deleting the first data table content from the larger data table T at the transactional engine if T is stored at the transactional engine. Following the example, the first N/2 records of the first data table 112 may be deleted from the larger data table T once the first data table is archived at the analytical engine 121. The larger data table T would then include only the second half N/2 of records. The second half of records constitute non-archived data.

For example, the transactional engine 101 may send the first data table 112 to the analytical engine 121 upon request e.g. received from the analytical engine 121. In another example, the transactional engine 101 may be configured to automatically send data to be archived to the analytical engine 121. The first data table 112 may for example be sent to the analytical engine 121 automatically upon storing the first data table 112 or after a the first data table has been stored for a predefined time period at the transactional engine 101 e.g. as soon as data has been stored for more than one year in the transactional engine 101 it may be sent to the analytical engine 121 in order to be archived. The archiving may be triggered automatically by the system 100 or by a user or application, e.g. by calling a stored procedure.

For example, a condition may require that the structure of the first archived data table has the same structure as the structure of the first data set 112.

For example, a set of archive conditions may be provided. A condition of the archive conditions may for example indicate that the structure of the first archived data table is to be maintained unchanged such that the access to the archived data remains unaffected over time e.g. the same query can be used for accessing the first archived data table during the life of the first archived data table. Another condition of the archive conditions may indicate that the content of the first archived data table may not be deleted or replaced. The addition of new records (e.g. by inserting or appending the new records to the first archived data table) keeping the same structure may be allowed. For example, the archive data e.g. T_ARCH may accept or may be configured to accept insert requests INSERT only.

For example, after archiving the first data table 112 at the analytical engine 121, changes that are applicable to archived data may occur. For example, the changes may be directly applied to the archived data at the analytical engine 121. For example, the analytical engine may receive a request to change the archived data at the analytical engine 121. The changes may or may not affect the non-archived data at the transactional and/or analytical engines. For example, if a new record is to be added to the archived data, this new record may or may not be added to the data stored in the transactional and analytical engines. In another example, the changes may affect the non-archived data (e.g. the second half N/2 of records) and may need then to be propagated to the archived data. Following the above example, the larger data table T may be affected by the changes. The changes may occur at the larger data table T before or while the archiving of the first data table 112 is performed. Those changes may need to be archived as well.

The changes that are applicable to the first archived data table may be of different types. For example, a change of the changes may include one or a combination of two or more of:
- adding one or more new records to the first archived data table,
- updating one or more records of the first archived data table, wherein updating includes replacing or deleting a record,
- adding a new attribute or column to the first archived data table e.g. by adding new records to the first archived data table having all attributes of the first archived data table in addition to a new attribute, and
- changing the type of one or more attributes of the first archived data table. For example, if an attribute of the first data archived table is varchar (30) type it may be changed to type varchar (100). This change may induce a rewrite of the values of the attribute to be in the new format of the new type.

In step 203, changes that are applicable to the first archived data table are archived at the analytical engine 121 using a second archived data table in case the changes do not satisfy at least one of the set of archive conditions the changes, otherwise the changes may be archived in or added to the first archived data table.

In step 205, a query may be received at the analytical engine for accessing archived data. The query may for example refers to data that has been introduced by the changes and that does not fulfil the archiving conditions.

At step 207, a determination is made whether the query involves data other than data in the first archived data table. If the determination is yes, the received query may be modified in step 209 for running the query on a joint of the archived data tables. For example, if the change refers to a new column that has been added by the changes, the query is to be modified in order to redirect the query to the joint of the first and second archived data tables. This may for example be performed by defining a database view over a combination of the archived data tables. The query may then be modified by redirecting the received query for running against the database view. Examples of database views are described in FIGS. 3A-C. If the determination is no, meaning the query involves data of the first archived data table only, the received query may be run in step 211 on the first archived data table.

Figure 3A:
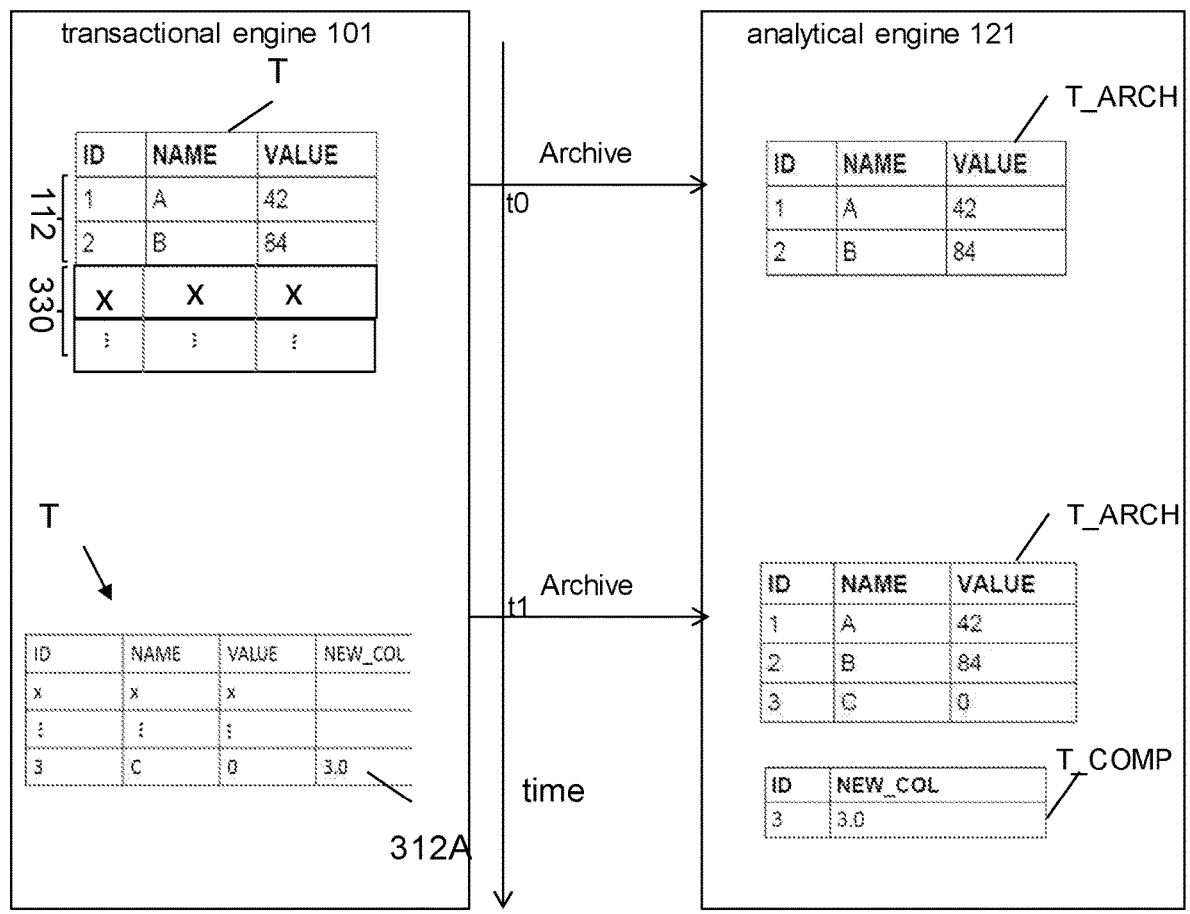
FIG. 3A is a diagrammatic illustration of archiving changes according to at least one embodiment.

Referring to FIG. 3A, a diagrammatic illustration of archiving changes further detailing step 203 is shown, according to an embodiment.

In this example, the transactional engine 101 stores the first data table 112 which is part of a larger table T, which has a structure involving three attributes: ID, NAME and VALUE. The first data table 121 is shown as comprising two records or rows (e.g. at time t0). T is shown as having the content of the first data table 112 to be archived and additional records 330 (marked with x values) 330. The records 330 are non-archived data. However, in another example, T may include only the records of the first data table 112. T has the same structure (at time t0) as the first data table 112 to be archived. The table T that is shown as part of the transactional engine 101 may be replicated to the analytical engine 121 e.g. before the archiving. The archive of the first data table may then be performed from (or using) the replicated T at the analytical engine 121.

As indicated in FIG. 3A, the first data table 112 is archived at the analytical engine 121 as a first archived data table T_ARCH. T_ARCH has the same structure (e.g. same schema) and content as the first data table 112. Since both tables have the same schema, accessing data in T and T_ARCH can be done with a query like this:

```
SELECT * FROM T
UNION ALL
SELECT * FROM T_ARCH
```

FIG. 3A further indicates that the data table T has changed over time by having an additional column and record in addition to the records 330. FIG. 3A shows an additional record 312A having the same attributes as the data table T in addition to a new attribute or new column NEW_COL. Adding a new column to data table T can for example be performed using a SQL statement such as "ALTER TABLE T ADD COLUMN new_col DOUBLE".

Applying the change to the data table T may include combination of the data table T and the record 312A resulting in a new structure of data table T e.g. with 4 attributes. The records 330 may for example be adapted such that they have default values for the new attribute. The change to the data table T (i.e. new record 312A) is to be archived (e.g. at time t1) as well. However, since the new record 312A induces a change in the structure of the data table T e.g. in the transactional engine and the analytical engine, without modifying T_ARCH, the above query definition will no longer work because T and T_ARCH are no longer structurally identical, i.e. both have a different schema. For that, and in order to fulfil the archive condition of maintaining T_ARCH unchanged, a new compensation table T_COMP (i.e. second archive data table) is added at the analytical engine, which stores the unique identifier from T and the additional new column. The table T_COMP may for example be created using the following SQL statement:

```
CREATE TABLE T_COMP (
  id INT NOT NULL PRIMARY KEY,
  new_col DOUBLE DEFAULT 100.0 )
```

The values of the attributes ID, VALUE and NAME of the structure of T_ARCH are stored as an additional record of T_ARCH. The value of the additional attribute NEW_COL is stored in the second archive data table T_COMP in additional to the corresponding ID=3 which keeps the link to the first archive data table T_ARCH.

When archiving new data, the archive from T into T_ARCH, the procedure has to split the data stream and direct all values for NEW_COL into the compensation table T_COMP (together with the respective identifier in column ID).

It is not necessary to insert a row into T_COMP for each and every row already existing in T_ARCH. The compensation needs only to be done for new rows.

In order to access the archived data which now (after t1) includes the first and second archive data tables, a database view may be created which involves a combination of T_ARCH an T_COMP like this:

```
CREATE VIEW T_ARCH2 AS
    SELECT a.*,
        CASE
            WHEN c.new_col IS NULL
            THEN 100.0
            ELSE c.new_col
        END
    FROM T_ARCH AS a LEFT OUTER JOIN T_COMP AS c
    ON ( a.id = c.id )
```

The database view creates a joint T_ARCH2 of the two archive data tables T_ARCH and T_COMP. For the rows of T_ARCH that exist before the change is performed, default values of the attribute NEW_COL may be returned. In the above example view, the default value is 100 and the LEFT OUTER JOIN provides the means to take the data from T_ARCH and only add the data from T_COMP for those rows where it is necessary.

A query against the archive data T_ARCH may then be redirected by running it against the above view T_ARCH2. In this way the archive conditions are fulfilled while enabling arching the changes.

Figure 3B:
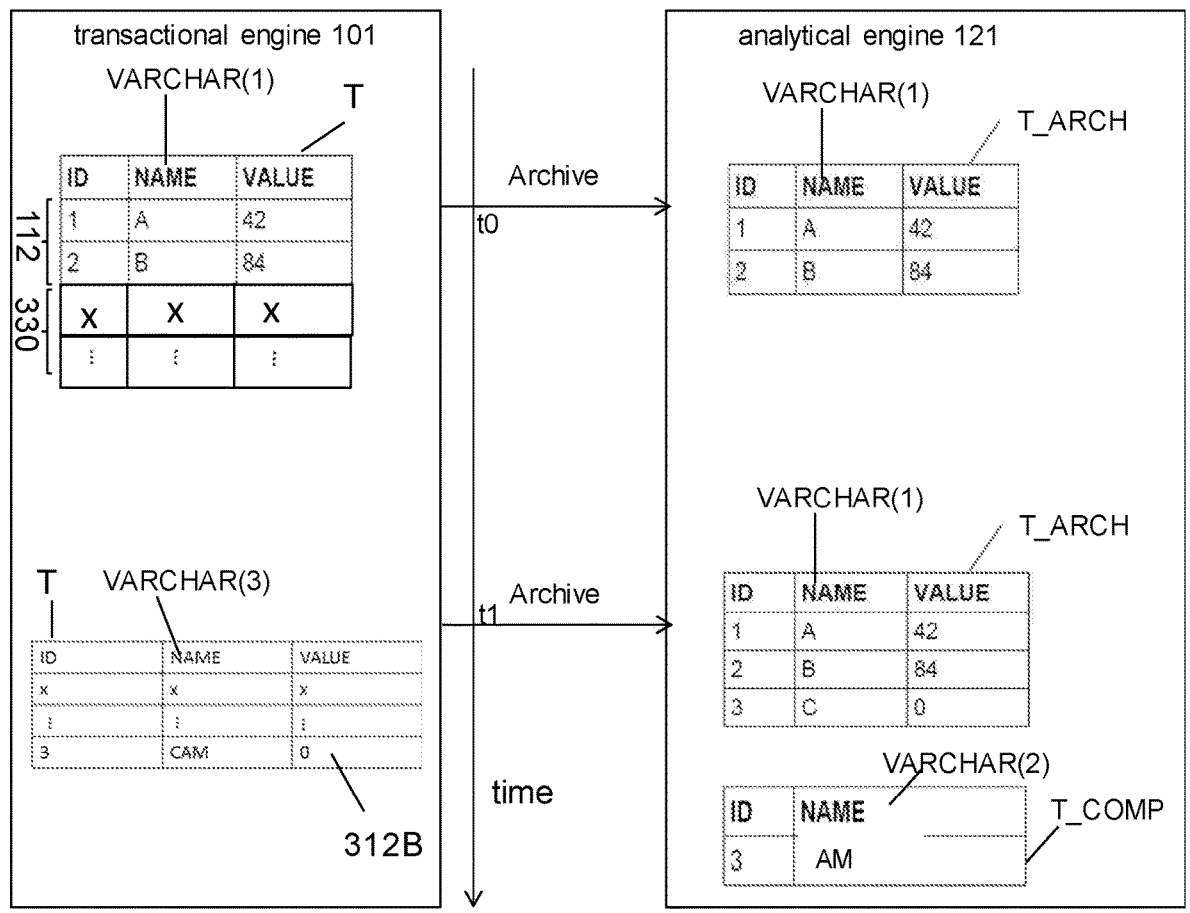
FIG. 3B is a diagrammatic illustration of archiving changes according to at least one embodiment.

Referring to FIG. 3B, a diagrammatic illustration of archiving changes further detailing step 203 is shown, according to an embodiment.

As with the above example, the transactional engine 101 stores the first data table 112 as part of data table T with a structure involving three attributes: ID, NAME and VALUE. The first data table 112 is shown as comprising two records or rows (e.g. at time t0). As indicated in FIG. 3B, the first data table 112 is archived at the analytical engine 121 as a first archived data table T_ARCH. T_ARCH has the same structure (e.g. same schema) and content as the first data table 112. T is shown as having the content of the first data table 112 to be archived and additional records (marked with x values) 330. However, in another example, T may include only the records of the first data table 112. As described above with reference to FIG. 3A, T may be replicated to the analytical engine, and the archiving as described herein may be performed based on the replicated T.

In this example, the data table T has changed over time by adding a new record 312B and changing the type of the attribute NAME. For example, before the change the attribute NAME has a type VARCHAR (1) and the new added record 312B, the type of the attribute NAME has changed to VARCHAR (3). This extension of the length of string column NAME can for example be performed by the SQL statement: ALTER TABLE t ALTER COLUMN name VARCHAR (3).

The change to the data table T (i.e. new record 312B) is to be archived (e.g. at time t1) as well. For that, a second archived data table or compensation table T_COMP may be created at the analytical engine. T_COMP can be enhanced to store either the complete long value or just the portion that exceeds the length limit of T_ARCH. T_COMP may be used to store changes that cannot be stored on T_ARCH at the analytical engine without violating the archive conditions.

FIG. 3B shows that a new row with ID=3, NAME=CAM, and VALUE=0 was added where the name exceeds the limit of T_ARCH. In other terms, the new value of NAME "CAM" has a length of 3 and can't be stored on the T_ARCH because the column NAME of T_ARCH allows only strings of length 1 to be stored. Thus, when archiving new data, the archiving procedure has to handle the data accordingly. For example, short strings may be inserted into T_ARCH and longer ones (or just the excess portion) into T_COMP. As shown in FIG. 3B, new record is added to T_ARCH, however only the first letter of string "CAM" is inserted into T_ARCH because it can only hold strings of size 1. The excess "AM" is stored in T_COMP in addition to the corresponding ID=3 to maintain the link between the two archived data tables. T_COMP has the attributes ID and NAME, where NAME has the length of 2 which is the difference between the changed type and the type of NAME in T_ARCH. In another example, the whole new value of NAME that has a type different from the type of NAME in T_ARCH can be completely stored in T_COMP.

In order to access the archived data which now includes the first and second archive data tables, a database view may be created which involves a combination of T_ARCH an T_COMP like this:

```
CREATE VIEW T_ARCH3 AS
SELECT a.id, a.name||COALESCE(c.name, ''), a.value
FROM T_ARCH AS a LEFT OUTER JOIN T_COMP AS c ON
ON (a.id=c.id)
```

Here COALESCE( ) is used to make sure the string concatenation (operator ||) does not produce a NULL just because no matching row in T_COMP was found for a row in T_ARCH. It is also possible to use a CASE expression as shown above.

If long values are stored completely in T_COMP—and not just the excessive part,—the database view definition has to be slightly different as follows.

```
CREATE VIEW T_ARCH4 AS
SELECT a.id, COALESCE(c.name, a.name), a.value
FROM T_ARCH AS a LEFT OUTER JOIN T_COMP AS
    c ON
ON (a.id=c.id)
```

Here, the value from T_COMP is taken if present. If nothing is found, the value from T_ARCH is used, which is the case for rows that existed already before T_COMP was created or rather for rows that existed before T_COMP was modified to handle the longer strings.

A query against the archive data T_ARCH may then be redirected by running it against the above view T_ARCH3 or T_ARCH4. In this way the archive conditions are fulfilled while enabling arching the changes.

In another example, in case the data table T has been changed so as to completely change the data type (e.g. from INT to VARCHAR or vice versa) of a given attribute of the data table T, the database view combining T_ARCH and T_COMP may implement the necessary conversion operations so that already existing archive data is converted on the fly. The following example assumes that the values in T_ARCH.VALUE shall be returned as string. A new column STR_VALUE of type VARCHAR is added to table T_COMP:

```
CREATE VIEW T_ARCH5 AS
SELECT a.id, a.name,
    COALESCE(c.str_value, CAST(a.value AS VARCHAR))
FROM T_ARCH AS a LEFT OUTER JOIN T_COMP AS c ON
    ON (a.id=c.id)
```

Figure 3C:
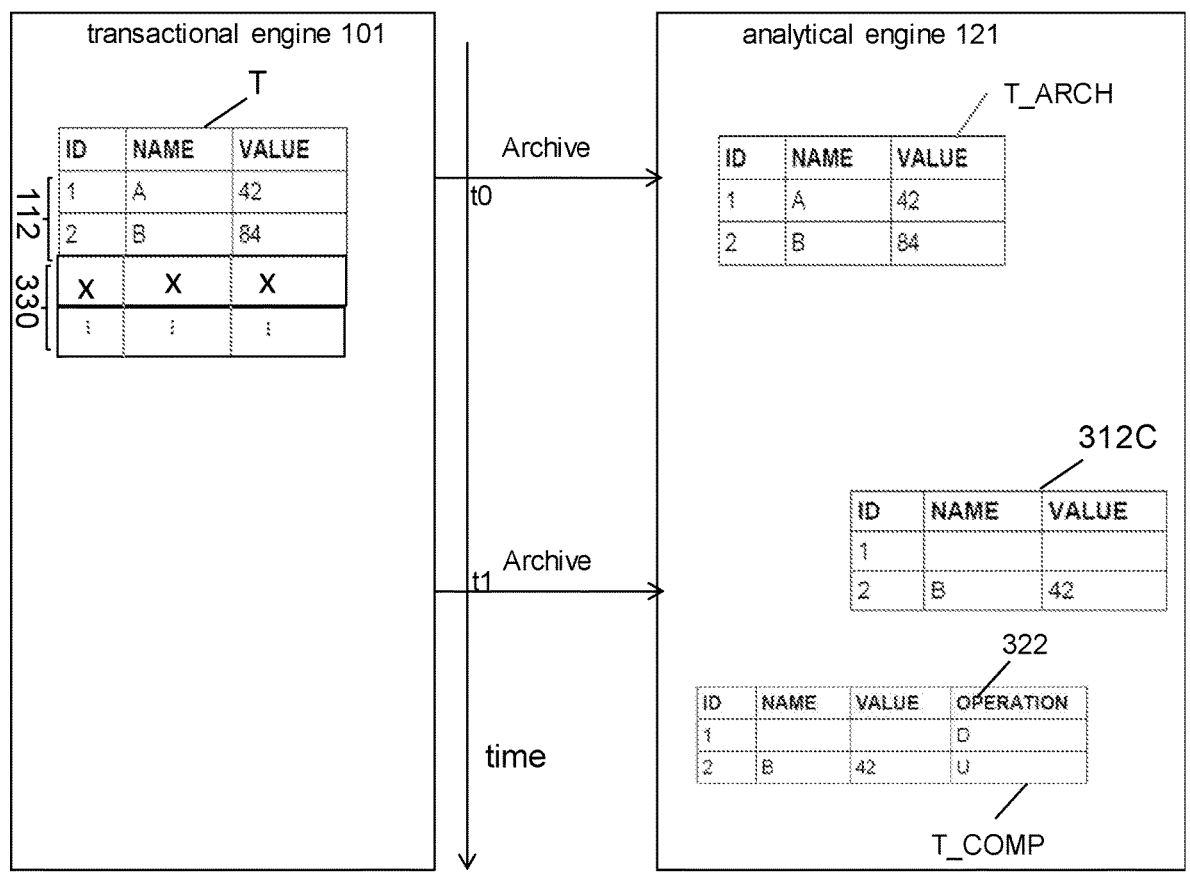
FIG. 3C is a diagrammatic illustration of archiving changes according to according to at least one embodiment.

Referring to FIG. 3C, a diagrammatic illustration of archiving changes further detailing step 203 is shown, according to a embodiment.

As with the above example, the transactional engine 101 stores the first data table 112 as part of a data table T with a structure involving three attributes: ID, NAME and VALUE. The first data table 112 is shown as comprising two records or rows (e.g. at time t0). As indicated in FIG. 3C, the first data table 112 is archived at the analytical engine 121 as a first archived data table T_ARCH. T_ARCH has the same structure (e.g. same schema) and content as the first data table 112. T is shown as having the content of the first data table 112 to be archived and additional records (marked with x values) 330. However, in another example, T may include only the records of the first data table 112. As described above with reference to FIG. 3A, T may be replicated to the analytical engine, and the archiving as described herein may be performed based on the replicated T.

In this example, the changes applicable to the first archived data table T_ARCH are directly applicable to the first archived data table T_ARCH. For example, an update request may be received for updating T_ARCH, the update may indicate deleting the content of the record having ID=1 and replacing the content of the record having ID=2. The update is indicated by table 312C. Table 312C is not stored as such in the analytical engine 121. It is just used for illustrating the update in question.

This update is to T_ARCH is a change to be archived (e.g. at time t1) as well following the present method. For that, a second archived data table or compensation table T_COMP may be created at the analytical engine. T_COMP may be used to store changes that cannot be stored on T_ARCH at the analytical engine without violating the archive conditions. The new data may be inserted in T_COMP, together with an operation indicator 322 that indicates the type of updates that has been performed. That indicator is used to identify deleted versus updated rows.

Table T_COMP may be defined like this:

```
CREATE TABLE T_COMP (
    id INT NOT NULL PRIMARY KEY,
    name VARCHAR(100) NOT NULL,
    value INT,
    operation CHAR(1) )
```

Example data in T_ARCH and T_COMP could be the following. It shows that the row with ID=1 was deleted and for the row with ID=2 the value was changed to 42.

In order to access the archived data which now includes the first and second archive data tables, a database view may be created which involves a combination of T_ARCH an T_COMP like this:

```
CREATE VIEW T_ARCH6 AS
SELECT a.id,
CASE WHEN c.id IS NOT NULL AND c.operation =
'U'
THEN c.name ELSE a.name END as name,
CASE WHEN c.id IS NOT NULL AND c.operation =
'U'
THEN c.value ELSE a.value END as value
FROM T_ARCH AS a LEFT OUTER JOIN T_COMP AS c ON
ON ( a.id = c.id )
WHERE c.id IS NULL OR c.operation < > 'D'
```

The view returns the data from T_COMP if it was updated. Logically deleted rows are filtered out. All other rows are returned from T_ARCH.

In one example, updates may be treated as a combination of a delete and an insert. However, that may lead to the same row existing twice in T_ARCH: the original row and the new, updated version. The present method assumes that INSERTs into T_ARCH are only done when new data is archived. Thus, only DELETE and UPDATE operations may need to be reflected in T_COMP. INSERT, UPDATE and DELETE may be SQL commands.

In another example a method for computer-implemented method for processing archived data is provided. The method includes the following steps: creating an archived database table; defining a view over a combination of the archived database table and a further database table; storing changes applicable to the archived data to the further database table and then "freezing" the further database table; processing queries targeting the archived database table against the view. For example, the changes applicable to the archived data may be e.g. a new column or changes in some values of existing columns.

Figure 4:
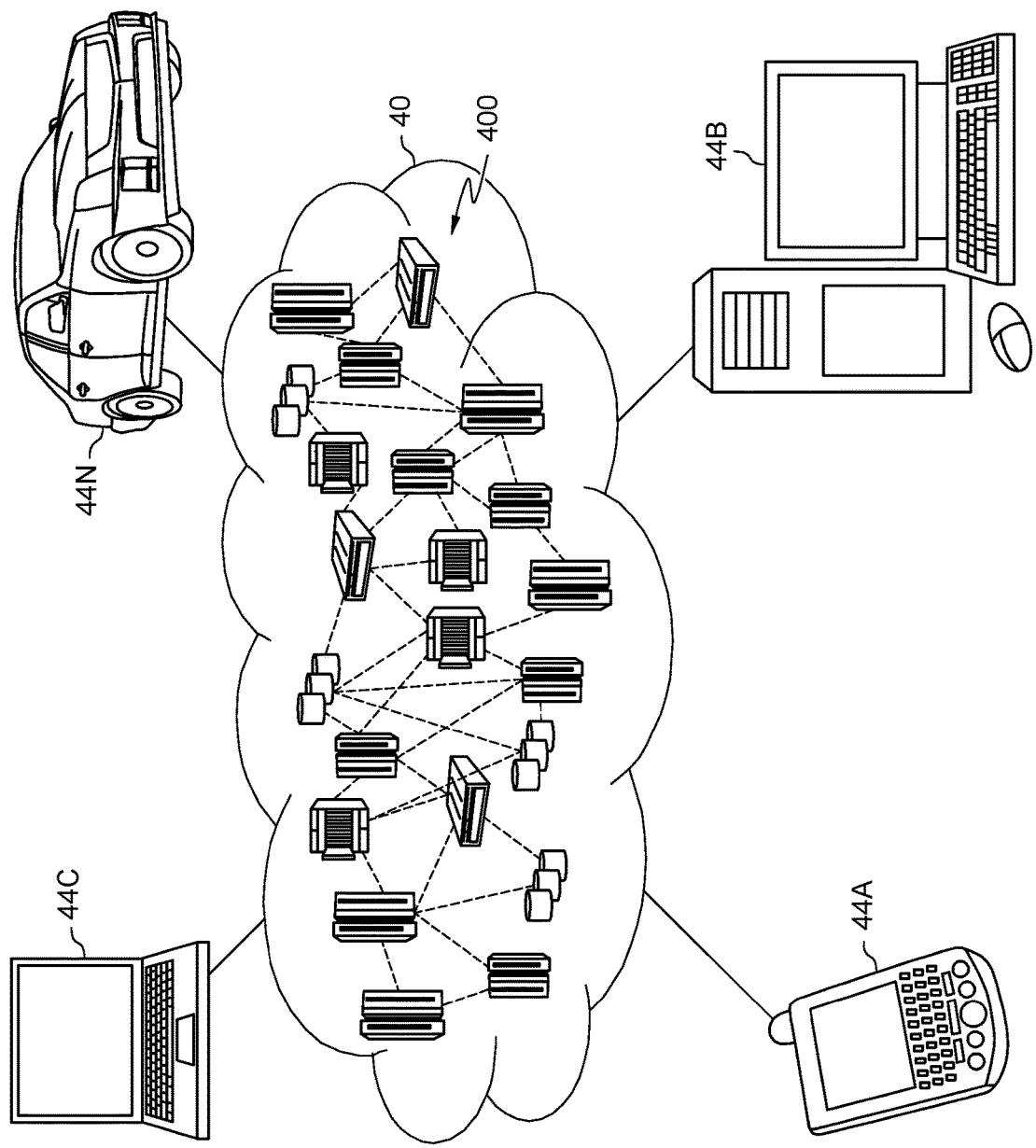
FIG. 4 depicts a cloud computing environment according to an embodiment of the present invention.

Referring now to FIG. 4, illustrative cloud computing environment 40 is depicted. As shown, cloud computing environment 40 includes one or more cloud computing nodes 400 with which local computing devices used by cloud consumers, such as, for example, personal digital assistant (PDA) or cellular telephone 44A, desktop computer 44B, laptop computer 44C, and/or automobile computer system 44N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 400 and cloud computing environment 40 can communicate with any type of computerized device over any type of network and/or network addressable connection (e.g., using a web browser).

Figure 5:
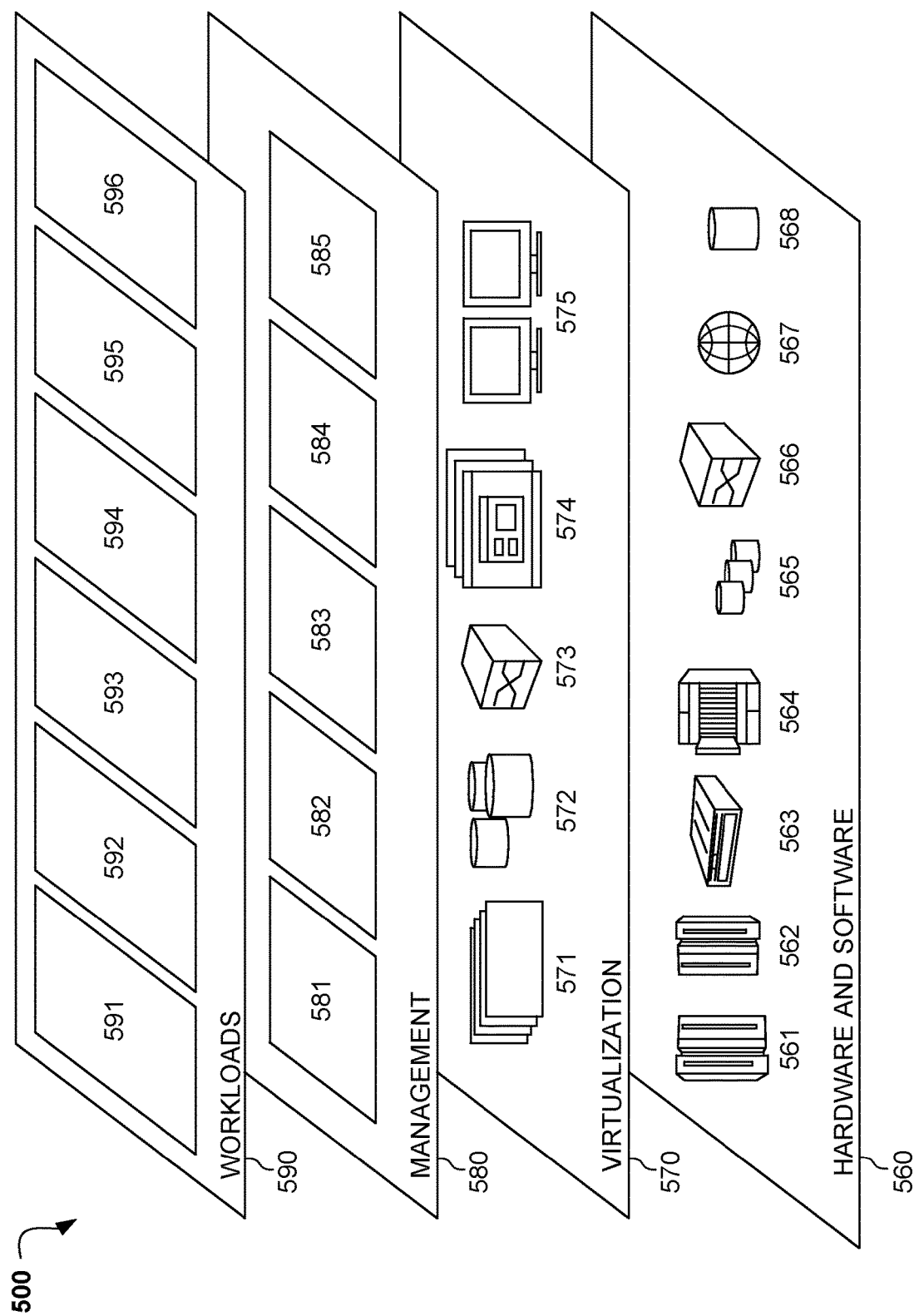
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and modifying archive data without data changes program 596. Modifying archive data without data changes program 596 may relate to retaining information regarding archived data and updates to the archived data.

What is claimed is:

1. A method for accessing archived data in a data processing system, the data processing system comprising a transactional engine maintaining a first data table and an analytical engine, the method comprising:
performing a first archiving at the analytical engine of the first data table at a time t0, wherein the first archiving creates a first archived data table comprising one or more attribute values of a first attribute type;
receiving a change of the first attribute type to a second attribute type to the first data table;
based on an attribute value type difference between a first data attribute value of the changed first data table compared to a corresponding first data attribute value of the first archived data table, performing a second archiving at the analytical engine at a time t1, wherein performing the second archiving comprises creating a second archived data table at the time t1, storing only a first portion of the first attribute value of the changed first data table that corresponds to the first attribute type in the first archived data table at the time t1 and storing only the remaining portion of the first attribute value of the first data table consisting of the attribute value type difference in the second archived data table at the time t1;
receiving at the analytical engine a query for accessing the archived data; and
running the query on a combination of the first archived data table and the second archived data table.

2. The method of claim 1, further comprising:
creating a database view comprising the combination of the first archived data table and the second archived data table, wherein running the query comprises redirecting the received query for running against the database view.

3. The method of claim 1, wherein running the query on the combination of the first archived data table and the second archived data table further comprises:
joining the first archived data table with records of the second archived data table having corresponding records of the first archived data table.

4. The method of claim 1, further comprising:
performing a third archiving at the analytical engine; and
creating a third archived data table, wherein the third archived data table comprises a description of the second archiving.

5. The method of claim 1,
wherein the data processing system comprises a hybrid on-line analytical processing (OLTP) and on-line analytical processing (OLAP) database system, wherein the transactional engine is configured for performing OLTP processes, and wherein the analytical engine is configured for performing OLAP processes.

6. The method of claim 1, further comprising:
based on the attribute value type difference between the first data table and the combination of the first archived data table and the second archived data table or a difference between a second data value of the first data table compared to a corresponding second data value of the combined first archived data table and the second archived data table, performing a third archiving at the analytical engine, wherein performing the third archiving comprises creating a third archived data table, storing a first portion of the a second data value in the first archived data table, storing a second portion of the second data value in the second archived data table, and storing a remaining portion of the second data value in the third archived data table, wherein the remaining portion of the second data value corresponds to the second structure difference;
receiving at the analytical engine a second query for the accessing archived data; and
running the query on a combination of the first archived data table, the second archived data table, and the third archived data table.

7. The method according to claim 1, wherein the first data table comprises an arrangement of data in one or more rows and one or more columns, and wherein a data element corresponds to each combination of a row of the one or more rows and a column of the one or more columns, and wherein a record comprises data elements of a column of the one or columns and corresponding data elements of a row of the one or more rows.

8. The method according to claim 1, further comprising:
identifying a new record in the first data table, wherein the new record is not in the first archived data table; and
archiving the new record in the first archived data table.

9. A computer program product for accessing archived data in a data processing system, the data processing system comprising a transactional engine maintaining a first data table and an analytical engine, the computer program product comprising:
one or more computer-readable storage medium and program instructions stored on at least one of the one or more storage medium, the program instructions executable by a processor, the program instructions comprising:
program instructions to perform a first archiving at the analytical engine of the first data table at a time t0, wherein the first archiving creates a first archived data table comprising one or more attribute values of a first attribute type;
program instructions to receive a change of the first attribute type to a second attribute type to the first data table;

based on an attribute value type difference between a first data attribute value of the changed first data table compared to a corresponding first data attribute value of the first archived data table, program instructions to perform a second archiving at the analytical engine at a time t1, wherein performing the second archiving comprises program instructions to create a second archived data table at the time t1, program instructions to store only a first portion of the first attribute value of the changed first data table that corresponds to the first attribute type in the first archived data table at the time t1 and program instructions to store only the remaining portion of the first attribute value of the first data table consisting of the attribute value type difference in the second archived data table at the time t1;

program instructions to receive at the analytical engine a query for accessing the archived data; and program instructions to run the query on a combination of the first archived data table and the second archived data table.

10. The computer program product of claim 9, further comprising:

program instructions to create a database view comprising the combination of the first archived data table and the second archived data table, wherein the program instructions to run the query comprises program instructions to redirect the received query for running against the database view.

11. The computer program product of claim 9, wherein the program instructions to run the query on the combination of the first archived data table and the second archived data table further comprises:

program instructions to join the first archived data table with records of the second archived data table having corresponding records of the first archived data table.

12. The computer program product of claim 9, further comprising:

program instructions to perform a third archiving at the analytical engine; and program instructions to create a third archived data table, wherein the third archived data table comprises a description of the second archiving.

13. The computer program product of claim 9, wherein the data processing system comprises a hybrid on-line analytical processing (OLTP) and on-line analytical processing (OLAP) database system, wherein the transactional engine is configured for performing OLTP processes, and wherein the analytical engine is configured for performing OLAP processes.

14. The computer program product of claim 9, further comprising:

based on the attribute value type difference between the first data table and the combination of the first archived data table and the second archived data table or a difference between a second data value of the first data table compared to a corresponding second data value of the combined first archived data table and the second archived data table, program instructions to perform a third archiving at the analytical engine, wherein program instructions to perform the third archiving comprises program instructions to create a third archived data table, program instructions to store a first portion of the a second data value in the first archived data table, program instructions to store a second portion of the second data value in the second archived data table, and program instructions to store a remaining portion of the second data value in the third archived data table, wherein the remaining portion of the second data value corresponds to the second structure difference;

program instructions to receive at the analytical engine a second query for accessing the archived data; and program instructions to run the query on a combination of the first archived data table, the second archived data table, and the third archived data table.

15. The computer program product of claim 9, wherein the first data table comprises an arrangement of data in one or more rows and one or more columns, and wherein a data element corresponds to each combination of a row of the one or more rows and a column of the one or more columns, and wherein a record comprises data elements of a column of the one or columns and corresponding data elements of a row of the one or more rows.

16. The computer program product of claim 9, further comprising:

program instructions to identify a new record in the first data table, wherein the new record is not in the first archived data table; and program instructions to archive the new record in the first archived data table.

17. A computer system for accessing archived data in a data processing system, the data processing system comprising a transactional engine maintaining a first data table and an analytical engine, the computer system comprising:

one or more processors, one or more computer-readable memories, one or more computer-readable storage medium, and program instructions stored on at least one of the one or more storage medium that when executed by at least one of the one or more processors via at least one of the one or more memories performs a method comprising:

performing a first archiving at the analytical engine of the first data table at a time t0, wherein the first archiving creates a first archived data table comprising one or more attribute values of a first attribute type;

receiving a change of the first attribute type to a second attribute type to the first data table;

based on an attribute value type difference between a first data attribute value of the changed first data table compared to a corresponding first data attribute value of the first archived data table, performing a second archiving at the analytical engine at a time t1, wherein performing the second archiving comprises creating a second archived data table at the time t1, storing only a first portion of the first attribute value of the changed first data table that corresponds to the first attribute type in the first archived data table at the time t1 and storing only the remaining portion of the first attribute value of the first data table consisting of the attribute value type difference in the second archived data table at the time t1;

receiving at the analytical engine a query for accessing the archived data; and running the query on a combination of the first archived data table and the second archived data table.

18. The computer system of claim 17, wherein the method further comprises:

creating a database view comprising the combination of the first archived data table and the second archived data table, wherein running the query comprises redirecting the received query for running against the database view.

19. The computer system of claim 17, wherein running the query on the combination of the first archived data table and the second archived data table further comprises:

joining the first archived data table with records of the second archived data table having corresponding records of the first archived data table.

20. The computer system of claim 17, wherein the method further comprises:
performing a third archiving at the analytical engine; and
creating a third archived data table, wherein the third archived data table comprises a description of the second archiving.

21. The computer system of claim 17,
wherein the data processing system comprises a hybrid on-line analytical processing (OLTP) and on-line analytical processing (OLAP) database system, wherein the transactional engine is configured for performing OLTP processes, and wherein the analytical engine is configured for performing OLAP processes.

22. The computer system of claim 17, wherein the method further comprises:
based on the attribute value type difference between the first data table and the combination of the first archived data table and the second archived data table or a difference between a second data value of the first data table compared to a corresponding second data value of the combined first archived data table and the second archived data table, performing a third archiving at the analytical engine, wherein performing the third archiving comprises creating a third archived data table, storing a first portion of the a second data value in the first archived data table, storing a second portion of the second data value in the second archived data table, and storing a remaining portion of the second data value in the third archived data table, wherein the remaining portion of the second data value corresponds to the second structure difference;
receiving at the analytical engine a second query for the accessing archived data; and
running the query on a combination of the first archived data table, the second archived data table, and the third archived data table.

23. The computer system of claim 17, wherein the first data table comprises an arrangement of data in one or more rows and one or more columns, and wherein a data element corresponds to each combination of a row of the one or more rows and a column of the one or more columns, and wherein a record comprises data elements of a column of the one or columns and corresponding data elements of a row of the one or more rows.

24. The computer system of claim 17, wherein the method further comprises:
identifying a new record in the first data table, wherein the new record is not in the first archived data table; and
archiving the new record in the first archived data table.

* * * * *